(12) United States Patent
Tu et al.

(10) Patent No.: US 11,546,564 B2
(45) Date of Patent: Jan. 3, 2023

(54) PROJECTION SYSTEM AND SELF-ADAPTIVE ADJUSTMENT METHOD THEREOF

(71) Applicant: Coretronic Corporation, Hsin-Chu (TW)

(72) Inventors: Hsun-Cheng Tu, Hsin-Chu (TW); Chien-Chun Peng, Hsin-Chu (TW); Chi-Wei Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/237,061

(22) Filed: Apr. 22, 2021

(65) Prior Publication Data

US 2021/0377501 A1     Dec. 2, 2021

(30) Foreign Application Priority Data

May 29, 2020   (CN) .......................... 202010475171.5

(51) Int. Cl.
*H04N 9/31*       (2006.01)
*G03B 21/14*    (2006.01)
*G03B 21/26*    (2006.01)

(52) U.S. Cl.
CPC ......... *H04N 9/3185* (2013.01); *G03B 21/142* (2013.01); *G03B 21/26* (2013.01); *H04N 9/3147* (2013.01); *H04N 9/3194* (2013.01)

(58) Field of Classification Search
CPC .. H04N 9/3185; H04N 9/3147; H04N 9/3179; H04N 9/3194; G03B 21/147
See application file for complete search history.

(56) References Cited

U.S. PATENT DOCUMENTS

| 2011/0007172 | A1 | 1/2011 | Miceli |
| 2017/0180689 | A1 | 6/2017 | Morrison et al. |
| 2018/0338123 | A1* | 11/2018 | Moule ................. H04N 9/3185 |

FOREIGN PATENT DOCUMENTS

CN           104778694           7/2015

* cited by examiner

*Primary Examiner* — Ryan D Howard
(74) *Attorney, Agent, or Firm* — JCIPRNET

(57) ABSTRACT

A projection system and a self-adaptive adjustment method are provided. The projection system includes a projection device, an image capturing device, and a processing device. The projection device sequentially projects sub-pattern arrays of a pattern array to a projection region of a projection surface. The image capturing device sequentially captures the sub-pattern arrays projected on the projection surface to output pattern images. The processing device analyzes the pattern images to obtain pattern coordinates and a pattern order of projected patterns in each pattern image. The processing device determines at least a part of the projected patterns to be effective patterns according to the pattern coordinates and the pattern order, and adjusts the projection device according to the effective patterns. The projection system and the self-adaptive adjustment method provide good projection quality.

16 Claims, 6 Drawing Sheets

PROJECTION SYSTEM AND SELF-ADAPTIVE ADJUSTMENT METHOD THEREOF

CROSS-REFERENCE TO RELATED APPLICATION

This application claims the priority benefit of China application serial no. 202010475171.5, filed on May 29, 2020. The entirety of the above-mentioned patent application is hereby incorporated by reference herein and made a part of this specification.

BACKGROUND

Technical Field

The disclosure relates to a display technique, and particularly relates to a projection system and a self-adaptive adjustment method thereof.

Description of Related Art

At present, with regard to projection correction of a projector, a general method is to use a projection device to project a pattern array onto a projection surface (which may be non-planar), and use an image capturing device to obtain a pattern array image of the projection surface. Then, a processing device compares the coordinates of each projected pattern in the pattern array image acquired by the image capturing device with the coordinates of the original pattern array to obtain distortion data of the image on the projection surface. Finally, the processing device may adjust the projection device or a projection image correspondingly according to the distortion data of the image on the projection surface, so that the adjusted projection device may project a smooth projection image on a non-planar projection surface. However, in some cases, since the projection surface may have a large fluctuation, positions of multiple patterns in the pattern array projected by the projection device are misaligned, overlapped, or blurred, resulting in a fact that the processing device is unable to effectively obtain pattern coordinates and/or correct the order of pattern array.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection system and a self-adaptive adjustment method thereof for the projection system to automatically adjust a projection setting, so as to provide a good projection effect on any projection surface.

Other objects and advantages of the disclosure may be further illustrated by the technical features broadly embodied and described as follows.

In order to achieve one or a portion of or all of the objects or other objects, an embodiment of the disclosure provides a projection system including a first projection device, an image capturing device, and a processing device. The first projection device is configured to sequentially project a plurality of first sub-pattern arrays of a first pattern array to a first projection region of a projection surface, and each of the first sub-pattern arrays includes a plurality of first patterns. The image capturing device is configured to sequentially capture the first sub-pattern arrays projected on the projection surface to output a plurality of first pattern array images. The processing device is coupled to the first projection device and the image capturing device, and is configured to analyze the first pattern array images to obtain a plurality of first pattern coordinates and a first pattern order of a plurality of first projected patterns in each of the first pattern images. The processing device determines at least a part of the first projected pattern array to be a plurality of first effective patterns according to the first pattern coordinates and the first pattern order of a plurality of patterns, and adjusts the first projection device according to the first effective patterns.

In order to achieve one or a portion of or all of the objects or other objects, an embodiment of the disclosure provides a self-adaptive adjustment method of a projection system including following steps. A first projection device is used to sequentially project a plurality of first sub-pattern arrays of a first pattern array to a first projection region of a projection surface, wherein each of the first sub-pattern arrays includes a plurality of first patterns. An image capturing device is used to sequentially capture the first sub-pattern arrays projected on the projection surface to output a plurality of first pattern array images. The first pattern array images are analyzed to obtain a plurality of first pattern coordinates and a first pattern order of a plurality of first projected patterns in each of the first pattern array images. It is determined that at least a part of the first projected patterns is a plurality of first effective patterns according to the first pattern coordinates and the first pattern order, and the first projection device is adjusted according to the first effective patterns.

Based on the above description, the embodiments of the disclosure have at least one of following advantages or effects. The projection system and the self-adaptive adjustment method thereof may use the projection device to sequentially project a plurality of sub-pattern arrays of the pattern array in time-division, so that the processing device may obtain the correct multiple pattern coordinates and pattern order through the image capturing device, so as to facilitate an effective projection correction operation performed by the processing device. In other words, the projection system and the self-adaptive adjustment method may perform relative projection adjustment on the projection surface with distortion, so as to provide a good projection effect.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations.

Figure 1:
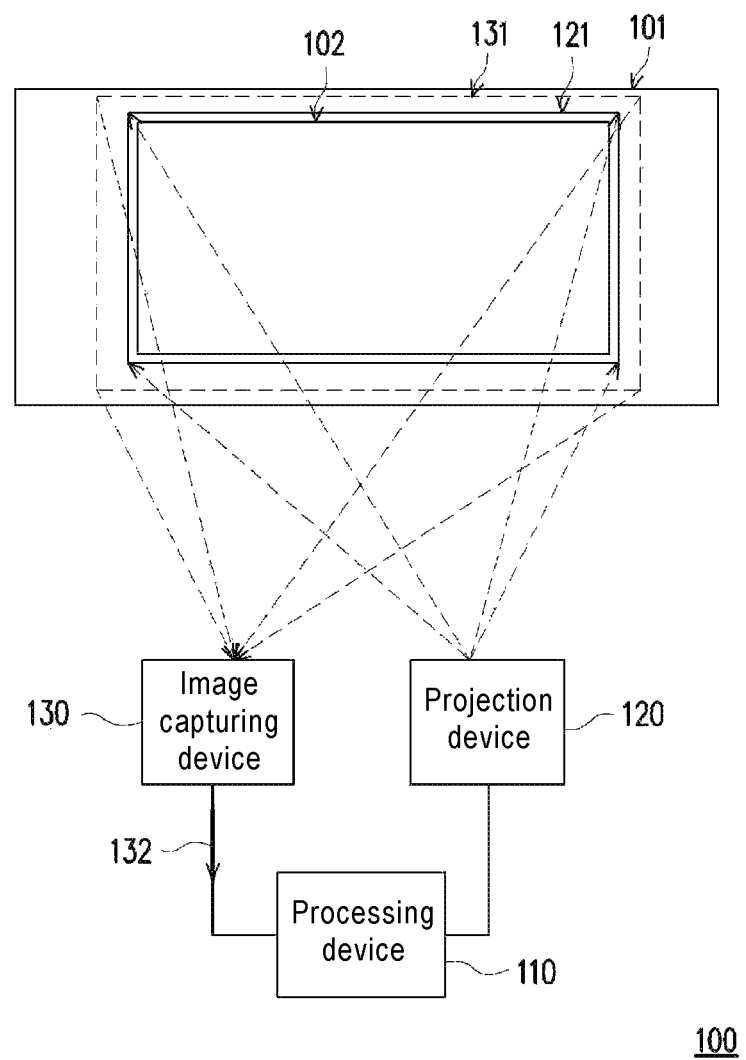
FIG. 1 is a projection schematic diagram of a projection system according to an embodiment of the disclosure.

FIG. 1 is a projection schematic diagram of a projection system according to an embodiment of the disclosure. Referring to FIG. 1, the projection system 100 includes a processing device 110, a projection device 120 and an image capturing device 130. The processing device 110 is coupled to the projection device 120 and the image capturing device 130. In the embodiment, when the projection system 100 is enabled to perform projection, the projection system 100 may automatically perform an adaptive adjustment operation. To be specific, the projection device 120 may sequentially project a plurality of sub-pattern arrays taken from a pattern array to a projection region 121 of a projection surface 101 in time-division. For example, the pattern array includes a plurality of patterns, each pattern has a pattern position, and a part of the multiple patterns constitutes a sub-pattern array, another part of the multiple patterns constitutes another sub-pattern array, i.e., each sub-pattern array contains a part of the patterns, and the sub-pattern arrays of the disclosure are not limited to two, and a plurality of sub-pattern arrays may be provided according to different embodiments. A range of the projection region 121 may be greater than or smaller than a range of a preset projection region 102 on the projection surface 101, but the disclosure is not limited thereto. The preset projection region 102 is a target region of projection performed by the projection device 120 after adjustment, and may be a part of the projection surface 101 or a range of another projection screen, which is not limited by the disclosure. Then, the image capturing device 130 may sequentially capture images of a plurality of sub-pattern arrays projected on the projection surface 101 from an image capturing region 131 corresponding to each projection of the projection device 120, and output the image of each of the sub-pattern arrays as a pattern image 132, where the image of each sub-pattern array corresponds to one pattern image 132. The preset projection region 102 in the projection surface 101 may be planar, non-planar, or have a specific curvature change. In the embodiment, the processing device 110 may analyze each pattern image 132 to effectively obtain the pattern coordinates and the pattern order of a plurality of projected patterns in each of the pattern images 132 used for adjusting a projection setting of the projection device 120.

For example, the processing device 110 may, for example, perform distortion correction or keystone adjustment of the projection device 120 according to a plurality of pattern coordinates of a plurality of projected patterns. The processing device 110 may compare the pattern positions of a plurality of patterns in the pattern array according to a plurality of pattern coordinates, so as to correspondingly adjust a projection image or an optical engine of the projection device 120 according to a shift result of the patterns, such that the projection image projected by the adjusted projection device 120 may match the distortion of the projection surface 101 to display a smooth and complete projection result on the projection surface 101, and a range of the projection image projected by the adjusted projection device 120 may be completely within the range of the preset projection region 102. It should be noted that a purpose that the processing device 110 obtains the correct pattern order is that, if the projection surface 101 has a large curvature change to cause a situation that some of the patterns projected by the projection device 120 are distorted or misaligned or overlapped with other patterns on the projection surface 101, the processing device 110 may correct such situation according to the pattern order to correctly adjust the projection device 120.

In the embodiment, the processing device 110 is, for example, a central processing unit (CPU), or other programmable general-purpose or special-purpose microprocessors, a digital signal processor (DSP), a programmable controller, an application specific integrated circuit (ASIC), a programmable logic Device (PLD), other similar processing devices, or a combination of the above devices. Moreover, the projection system 100 may also include a memory. The memory may be configured to record image data and image analysis modules described in various embodiments of the disclosure for the processing device 110 to access and execute.

In the embodiment, the projection device 120 may include related circuit elements such as a light source module (not shown), an optical engine module (not shown), a projection lens set (not shown), an image transmission interface (not shown), etc. The light source module may include a light emitting unit such as a discharge bulb, a light emitting diode, or a laser light source. The optical engine module may include a reflective spatial light modulator or a transmissive spatial light modulator. The reflective spatial light modulator may be, for example, a reflective liquid crystal on silicon (LCOS) or a digital micro-mirror device (DMD). The transmissive spatial light modulator may be, for example, a transparent liquid crystal panel. The projection lens set may include a plurality of lenses, and the lenses may form a projection optical path.

In the embodiment, the image capturing device 130 may include one or a plurality of cameras. It should be noted that a range of the image capturing region 131 on which the image capturing device 130 performs an image capturing operation on the projection surface 101 may be greater than or equal to the range of the projection region 121 on which the projection device 120 performs projection on the projection surface 101. In addition, the processing device 110, the projection device 120, and the image capturing device 130 may be integrated in a same projector device, or separately provided in different devices, which is not limited by the disclosure.

Figure 2A:
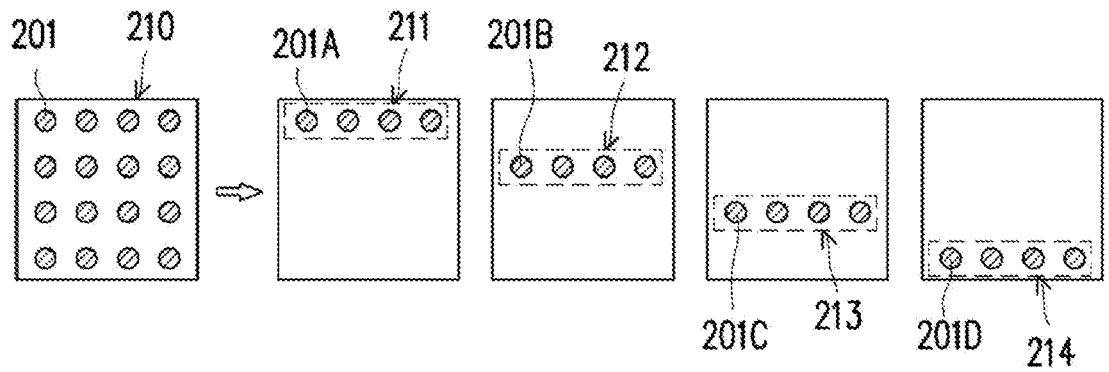
FIG. 2A is a schematic diagram illustrating arrangement of a pattern array and sub-pattern arrays according to a first embodiment of the disclosure.

The projection system and the self-adaptive adjustment method thereof of the disclosure are described in detail below. FIG. 2A is a schematic diagram illustrating arrangement of a pattern array and sub-pattern arrays according to a first embodiment of the disclosure. Referring to FIG. 1 and FIG. 2A, a pattern array 210 includes a plurality of patterns 201 arranged in an array, and the pattern array 210 may be divided into a plurality of sub-pattern arrays 211-214. To be specific, the projection device 120 sequentially projects the sub-pattern arrays 211-214 onto the projection region 121 of the projection surface 101 in time-division. The sub-pattern arrays 211-214 respectively include a plurality of patterns 201A-201D, and each of the sub-pattern arrays 211-214 is formed by the patterns 201 of different column of the pattern array 210. Moreover, each pattern 201 of the pattern array 210 appears in the sub-pattern arrays 211-214 by the same number of times. It should be noted that the projection device 120 may sequentially project the sub-pattern arrays 211-214, or may sequentially project the sub-pattern array 211, the sub-pattern array 213, the sub-pattern array 212, and the sub-pattern array 214, and the projection sequence of the sub-pattern arrays is not limited by the disclosure.

In the embodiment, the patterns 201 are, for example, circles, and each pattern 201A of the sub-pattern array 211 is separated from each pattern 201B of the adjacent sub-pattern array 212, but the disclosure is not limited thereto. In other embodiments, in the pattern array 210, two nearest adjacent patterns 201 may be partially overlapped. For example, the minimum distance between two pattern centers of the patterns 201 of the sub-pattern arrays projected by the projection device 120 in any two adjacent projections may be smaller than a pattern diameter of the pattern 201. For example, the minimum distance between the two pattern centers of each pattern 201A of the sub-pattern array 211 and each pattern 201B of the sub-pattern array 212 is smaller than the pattern diameter of the pattern 201. In other words, each pattern 201A of the sub-pattern array 211 may be partially overlapped with each pattern 201B of the adjacent sub-pattern array 212. It should be noted that the shape of the pattern of the disclosure is not limited to a circle, and the shape of the pattern may also be a triangle, a square, or other shapes, and the above-mentioned pattern diameter may be a pattern width (or length), so that other shapes or forms of the patterns may also be used in the adaptive adjustment operation of the disclosure.

Referring to FIG. 1 and FIG. 2A, when the projection device 120 sequentially projects the sub-pattern arrays 211-214 to the projection region 121 of the projection surface 101 in time-division, the image capturing device 130 correspondingly captures images (i.e. the pattern images 132) of the sub-pattern arrays 211-214 projected on the projection surface 101 in succession, and the processing device 110 may analyze the successive capturing results (i.e. the pattern images 132) of the image capturing device 130 to obtain a plurality of pattern coordinates and a pattern order of a plurality of projected patterns in the pattern images 132 captured by the image capturing device 130, where the projected patterns refer to images of each of the patterns 201A-201D projected to the projection surface 101 that are captured by the image capturing device 130. Alternatively, the processing device 110 may recombine and order the sequentially projected patterns 201A-201D into a similar pattern array (similar to the pattern array 210, but possibly distorted). In this regard, the processing device 110 may determine at least a part of the projected patterns to be a plurality of effective patterns according to the pattern coordinates and the pattern order. The effective patterns refer to patterns within the range of the preset projection region 102, and may be correctly captured and ordered by the image capturing device 130. Conversely, if a certain pattern is projected beyond the range of the preset projection region 102, or the certain pattern cannot be captured and ordered correctly, the certain pattern is defined as an invalid pattern by the processing device 110. Therefore, the processing device 110 may determine an effective projection range of the projection device 120 within the range of the preset projection region 102 according to a plurality of effective patterns, and correspondingly adjust the projection device 120, so that the projection image corresponds to a distortion result of the projection surface 101.

Figure 2B:
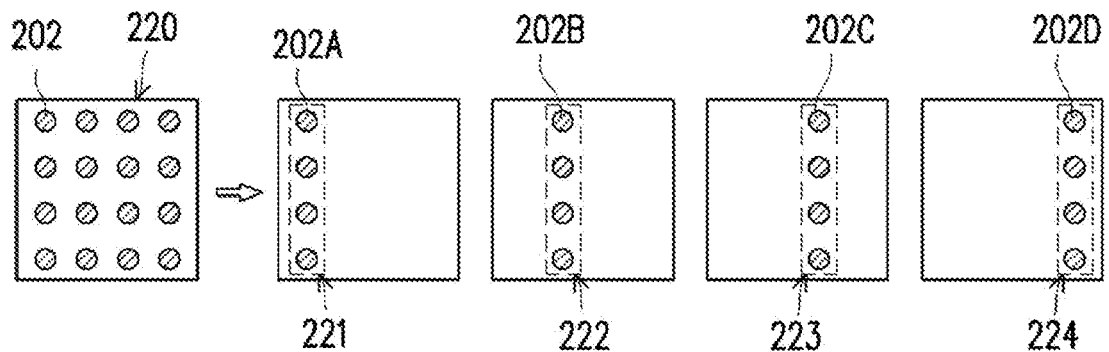
FIG. 2B is a schematic diagram illustrating arrangement of a pattern array and sub-pattern arrays according to a second embodiment of the disclosure.

FIG. 2B is a schematic diagram illustrating arrangement of a pattern array and sub-pattern arrays according to a second embodiment of the disclosure. Referring to FIG. 1 and FIG. 2B, the pattern array 220 includes a plurality of patterns 202 arranged in an array. The pattern array 220 may be divided into a plurality of sub-pattern arrays 221-224. To be specific, the projection device 120 sequentially projects the sub-pattern arrays 221-224 onto the projection region 121 of the projection surface 101 in time-division. The sub-pattern arrays 221-224 respectively include a plurality of patterns 202A-202D, and each of the sub-pattern arrays 221-224 is formed by the patterns 202 of different rows of the pattern array 220. In addition, each pattern 202 of the pattern array 220 appears in the sub-pattern arrays 221-224 by the same number of times.

Compared to FIG. 2A, the projection device 120 of the embodiment projects the sub-pattern arrays 221-224 of the pattern array 220 row by row to avoid misjudgment of the processing device 110 on pattern coordinates and pattern order of the pattern array 220 due to distortion of the projection surface 101, but the pattern features of the pattern array 220 of the embodiment may also refer to the description of the above embodiment, and detail thereof is not repeated. Moreover, the projection device 120 of the disclosure is not limited to projecting the sub-pattern arrays in the pattern array column by column or row by row. In an embodiment, the projection device 120 may also first project the sub-pattern arrays 211-214 column by column as shown in FIG. 2A, and then project the sub-pattern arrays 221-224 row by row as shown in FIG. 2B, and each pattern of the pattern array appears in the sub-pattern arrays 211-214 and 221-224 by the same number of times (for example, each pattern appears twice). For example, each sub-pattern array is a different column or different row in the pattern array 210, so that the processing device 110 may control the image capturing device 130 to capture images of the projected sub-pattern arrays to perform multiple corrections for each pattern, so as to obtain more accurate pattern coordinates and pattern order of a plurality of projected patterns.

Figure 2C:
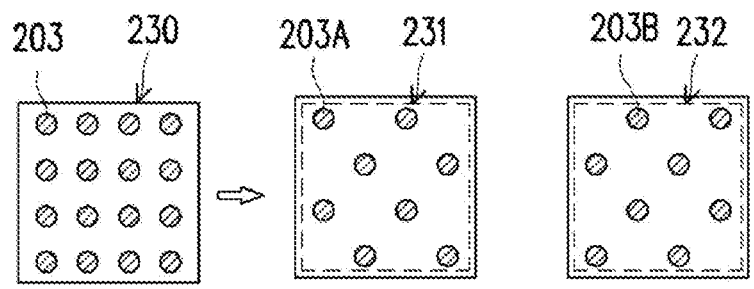
FIG. 2C is a schematic diagram illustrating arrangement of a pattern array and sub-pattern arrays according to a third embodiment of the disclosure.

FIG. 2C is a schematic diagram illustrating arrangement of a pattern array and sub-pattern arrays according to a third embodiment of the disclosure. Referring to FIG. 1 and FIG. 2C, the pattern array 230 includes a plurality of patterns 203 arranged in an array. To be specific, the projection device 120 sequentially projects sub-pattern arrays 231 and 232 onto the projection region 121 of the projection surface 101 in time-division. The sub-pattern arrays 231 and 232 respectively include a plurality of patterns 203A and 203B, and the patterns 203 of each of the sub-pattern arrays 231 and 232 are not adjacent to each other in the pattern array 230, for example, the sub-pattern array 231 is formed by the odd-numbered patterns of the odd-numbered rows and the even-numbered patterns of the even-numbered rows in the pattern array 230, and the sub-pattern array 232 is formed by the even-numbered patterns of the odd-numbered rows and the odd-numbered patterns of the even-numbered rows in the pattern array 230, but the disclosure is not limited thereto.

Compared to FIG. 2A and FIG. 2B, the projection device 120 of the embodiment uses a method of respectively projecting the odd-numbered patterns and the even-numbered patterns to avoid misjudgment of the processing device 110 on pattern coordinates and pattern order of the pattern array 230 due to distortion of the projection surface 101, but the pattern features of the pattern array 230 of the embodiment may also refer to the description of the above embodiment, and detail thereof is not repeated.

Figure 3:
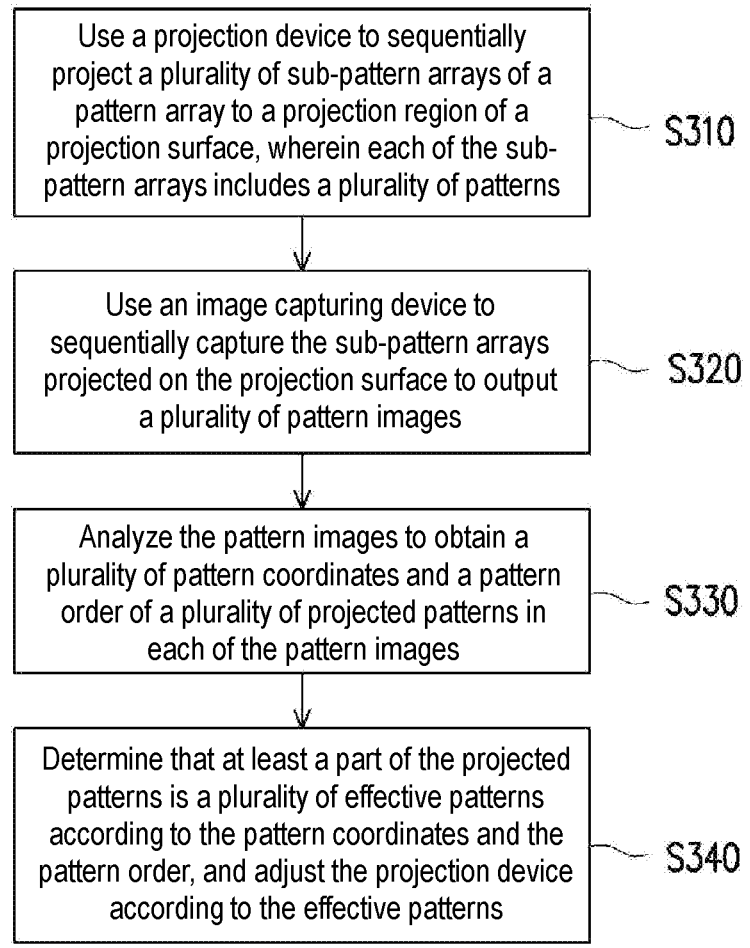
FIG. 3 is a flowchart illustrating a self-adaptive adjustment method of the projection system of the embodiment of FIG. 1 according to the disclosure.

FIG. 3 is a flowchart illustrating a self-adaptive adjustment method of the projection system of the embodiment of FIG. 1 according to the disclosure. Referring to FIG. 1, FIG. 2A and FIG. 3, the self-adaptive adjustment method of the embodiment may be at least applied to the projection system of FIG. 1, and the arrangement of the sub-pattern arrays of FIG. 2A is taken as an example for description. In step S310, the projection device 120 sequentially projects a plurality of sub-pattern arrays 211-214 of the pattern array 210 to the projection region 121 of the projection surface 101, where each of the sub-pattern arrays 211-214 includes a plurality of patterns 201A-201D. In step S320, the image capturing device 130 sequentially captures the sub-pattern arrays 211-214 projected on the projection surface 101 to output a plurality of pattern images 132. For example, after the projection device 120 projects the sub-pattern array 211, the image capturing device 130 captures an image of the sub-pattern array 211 projected on the projection surface 101. After the capturing is completed, the projection device 120 projects the sub-pattern array 212, and then projection and capturing of the sub-pattern arrays are sequentially performed. In step S330, the processing device 110 analyzes the pattern images 132 to obtain a plurality of pattern coordinates and a pattern order of a plurality of projected patterns in each of the pattern images 132. In step S340, the processing device 110 determines at least a part of the projected patterns to be a plurality of effective patterns according to the pattern coordinates and the pattern order, and adjusts the projection device 120 according to the effective patterns, for example, the projection region 121 is conformed to the range of the preset projection region 102 and is displayed as a smooth and complete projection image. Therefore, the self-adaptive adjustment method of the embodiment enables the projection system 100 to perform automatic and effective adaptive adjustment, to provide a good projection effect.

However, regarding device features, projection method and implementation details of the projection system 100 of the embodiment, reference may be made to the description of the above-mentioned embodiments of FIG. 1 and FIG. 2A to obtain sufficient instructions, suggestions, and implementation descriptions, so that details thereof are not repeated.

Figure 4:
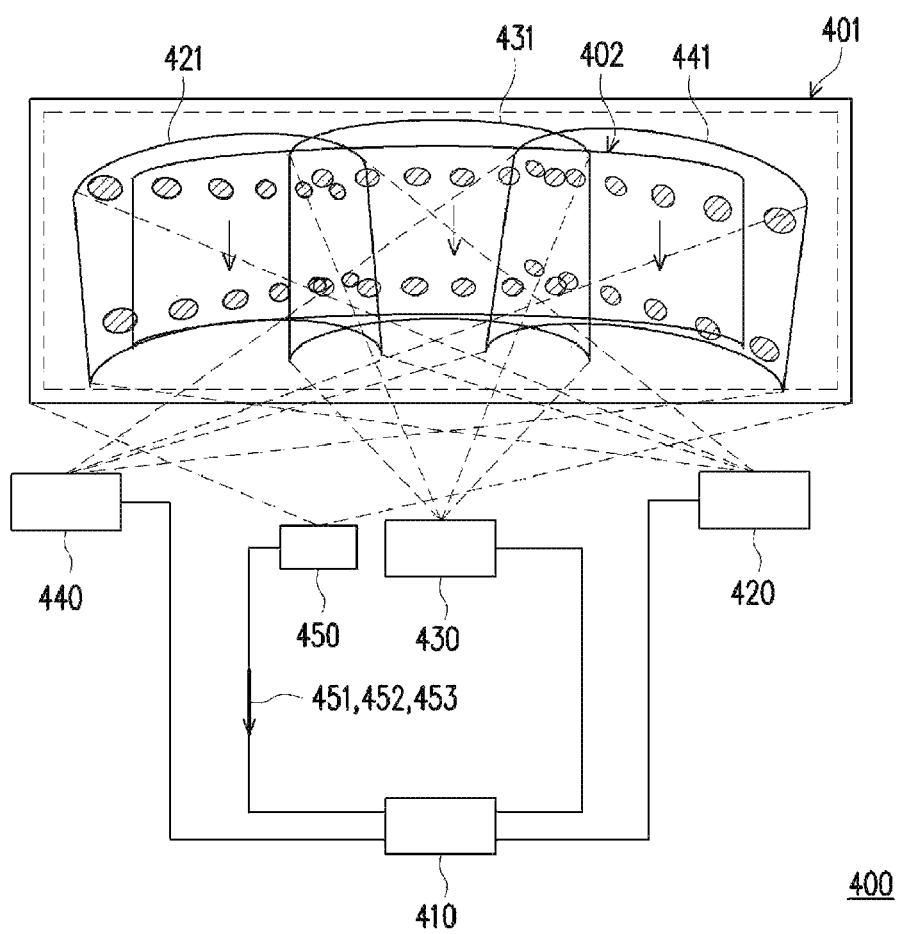
FIG. 4 is a projection schematic diagram of a projection system according to another embodiment of the disclosure.

FIG. 4 is a projection schematic diagram of a projection system according to another embodiment of the disclosure. The projection system 400 includes a processing device 410, projection devices 420-440 and an image capturing device 450. To be specific, in the embodiment, three projection devices are taken as an example for description, but the disclosure is not limited to the three projection devices, and in other embodiments, the number of the projection devices may be two, or four or more. The processing device 410 is coupled to the first projection device 420, the second projection device 430, the third projection device 440 and the image capturing device 450. In the embodiment, the first projection device 420, the second projection device 430, and the third projection device 440 are configured to sequentially perform projections on a projection surface 401. A preset projection region 402 is a target region for projection after adjustment of each of the projection devices, which may be a part of the projection surface 401 or the scope of the projection screen, and is not limited by the disclosure. The first projection device 420, the second projection device 430, and the third projection device 440 may respectively adopt one of the projection methods of the sub-pattern arrays as described in the above-mentioned embodiments of FIGS. 2A-2C. Taking the projection method of the sub-pattern arrays of the embodiment of FIG. 2A as an example, referring to FIG. 2A and FIG. 4, the first projection device 420 may sequentially project a plurality of first sub-pattern arrays 211-214 (project one column at a time) of the first pattern array 210 having a plurality of first patterns 201 to a first projection region 421 of the projection surface 401 in time-division, the image capturing device 450 sequentially captures and outputs a plurality of first pattern images 451. The processing device 410 may analyze a plurality of first projected patterns in the first pattern images 451 to obtain a plurality of first pattern coordinates and a first pattern order of the first projected patterns in each of the first pattern images 451. According to this logic, the second projection device 430 and the third projection device 440 also perform time-dividing projection operations on a plurality of second patterns of a second pattern array and a plurality of third patterns of a third pattern array in a second projection region 431 and a third projection region 441 (for example, perform time-dividing sequential projections on the sub-pattern arrays 211-214 in FIG. 2A), where the first projection region 421 is partially overlapped with the second projection region 431, the second projection region 431 is partially overlapped with the third projection region 441, and the processing device 410 may correspondingly obtain a plurality of second pattern coordinates, a plurality of third pattern coordinates, a second pattern order and a third pattern order of a plurality of second pattern images 452 and a plurality of third pattern images 453 projected by the second projection device 430 and the third projection device 440.

In the embodiment, the processing device 410 may, for example, respectively perform distortion correction or keystone adjustment on the first projection device 420, the second projection device 430, and the third projection device 440 according to a plurality of first to third pattern coordinates and first to third pattern orders, so that a first projection image, a second projection image and a third projection image respectively projected by the adjusted first projection device 420, second projection device 430 and third projection device 440 may be respectively matched to the distortion of the projection surface 401 to display a smooth and complete projection result at overlapped regions between the projection images on the projection surface 401, or the first projection image, the second projection image and the third projection image are conformed to the preset projection region 402 on the projection surface 401 to display a smooth and complete projection result (for example, the first projection region 421 to the third projection region 441 of the first projection device 420 to the third projection device 440 are adjusted to match the preset projection region 402, or the projection region beyond the preset projection region 402 is set as a non-projection image region). For example, the patterns overlapped between the first projection region 421 and the second projection region 431 may be determined according to the first pattern order and/or the first pattern coordinates, and the patterns overlapped between the first projection region 421 and the second projection region 431 may be determined according to the second pattern order and/or the second pattern coordinates, and the first projection image and the second projection image respectively projected by the first projection device 420 and/or the second projection device 430 are adjusted according to the first pattern coordinates and/or the second pattern coordinates of the overlapped patterns, but the disclosure is not limited thereto. In other embodiments, the first projection image projected by the first projection device 420 may be adjusted according to the first pattern order and the first pattern coordinates. However, regarding the projection methods of the respective pattern arrays and the adjusting methods of the respective projection images of the first projection device 420, the second projection device 430 and the third projection device 440 of the embodiment, reference may be made to the description of the above-mentioned embodiments of FIG. 1 and FIG. 3 to obtain sufficient instructions, suggestions, and implementation descriptions, so that details thereof are not repeated.

Figure 5:
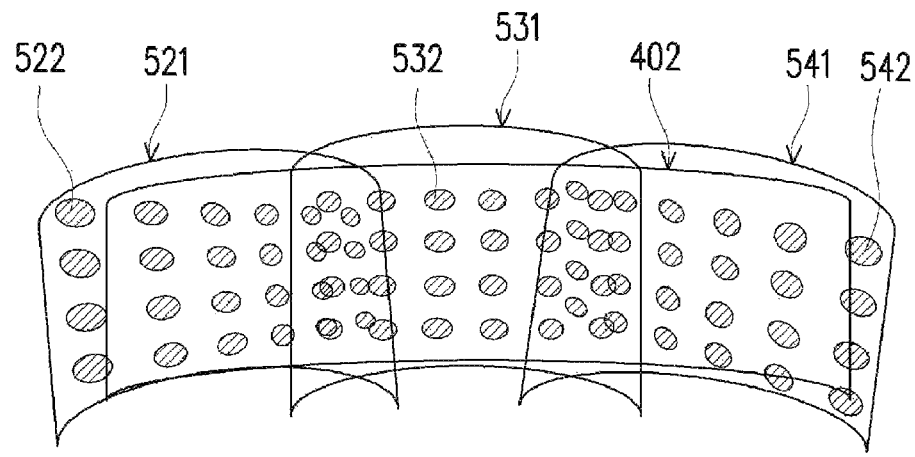
FIG. 5 is a schematic diagram of overlapping a plurality of pattern array images of the embodiment of FIG. 4.
Figure 6:
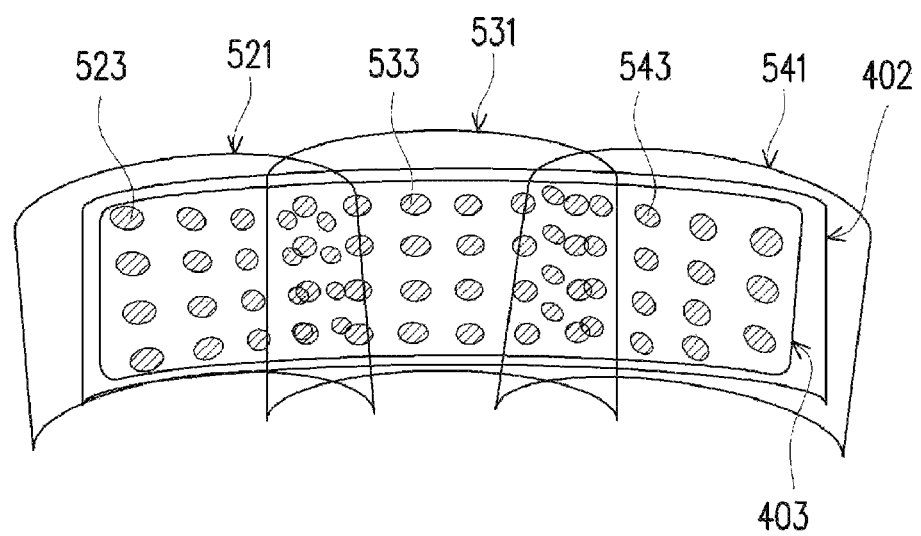
FIG. 6 is a schematic diagram of an overlapped projection region of the embodiment of FIG. 4.

To be specific, FIG. 5 is a schematic diagram of overlapping a plurality of pattern images of the embodiment of FIG. 4. FIG. 6 is a schematic diagram of an overlapped projection region of the embodiment of FIG. 4. Referring to FIG. 4 to FIG. 6, after the processing device 410 receives the first pattern images 451, the second pattern images 452, and the third pattern images 453, and before performing the distortion correction or keystone adjustment, the processing device 410 may merge the pattern images 451-453 into a first complete pattern image 521, a second complete pattern image 531 and a third complete pattern image 541. Moreover, as shown in FIG. 5 and FIG. 6, the processing device 410 may compare a plurality of first projected patterns 522, a plurality of second projected patterns 532 and a plurality of third projected pattern images 542 of the first complete pattern image 521, the second complete pattern image 531 and the third complete pattern image 541 one-by-one to determine whether they are located in the preset projection region 402, so as to determine a plurality of first effective patterns 523, a plurality of second effective patterns 533 and a plurality of third effective patterns 543, and adjust the first projection device 420, the second projection device 430 and the third projection device 440 according to the first effective patterns 523, the second effective patterns 533 and the third effective patterns 543.

Further, in the embodiment, after the first projection device 420, the second projection device 430, and the third projection device 440 are adjusted to perform the distortion correction or keystone adjustment, the processing device 410 may order the first effective patterns 523, the second effective patterns 533, and the third effective patterns 543 into a plurality of full image effective patterns of a full image, and the processing device 410 determines a border of an overlapped projection region 403 of the first projection device 420, the second projection device 430, and the third projection device 440 according to the full image effective patterns, and adjust the border of the overlapped projection region 403 to match the range of the preset projection region 402. In this way, the overlapped projection region 403 is within the range of the preset projection region 402. Therefore, the projection system 400 may effectively perform distortion correction or keystone adjustment on the first projection device 420, the second projection device 430, and the third projection device 440, and may also perform an automatic border operation on multiple projection images to provide a good full image (a splicing result of multiple images) projection effect, but the disclosure is not limited thereto. In other embodiments, the steps of distortion correction and automatic border may be performed at the same time, or an operation sequence thereof may be exchanged.

Figure 7:
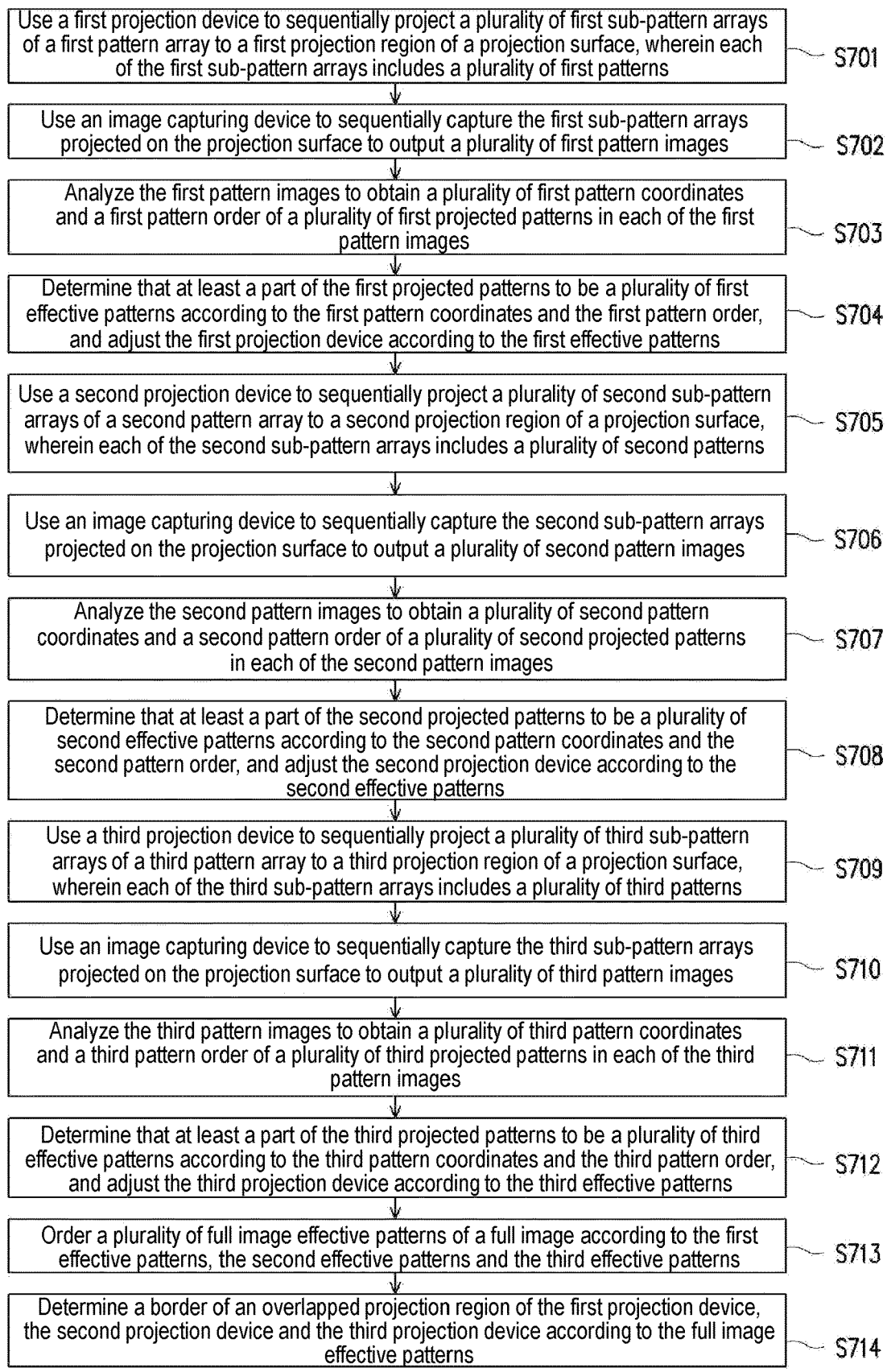
FIG. 7 is a flowchart illustrating a self-adaptive adjustment method of the projection system of the embodiment of FIG. 4.

FIG. 7 is a flowchart illustrating a self-adaptive adjustment method of the projection system of the embodiment of FIG. 4. Referring to FIG. 4 to FIG. 7, the self-adaptive adjustment method of the embodiment may be at least applied to the projection system 400 of FIG. 4. In step S701, the first projection device 420 sequentially projects a plurality of first sub-pattern arrays (for example, the sub-pattern arrays 211-214) of a first pattern array (for example, the pattern array 210) to the first projection region 421 of the projection surface 401, where each of the first sub-pattern arrays includes a plurality of first patterns. In step S702, the image capturing device 450 sequentially captures the first sub-pattern arrays projected on the projection surface 401 to output a plurality of first pattern images 451. In step S703, the processing device 410 analyzes the first pattern images 451 to obtain a plurality of first pattern coordinates and a first pattern order of a plurality of first projected patterns 522 in each of the first pattern images 451. In step S704, the processing device 110 determines at least a part of the first projected patterns 522 to be a plurality of first effective patterns 523 according to the first pattern coordinates and the first pattern order, and adjusts the first projection device 420 according to the first effective patterns 523.

In step S705, the second projection device 430 sequentially projects a plurality of second sub-pattern arrays (for example, the sub-pattern arrays 211-214) of a second pattern array (for example, the pattern array 210) to the second projection region 431 of the projection surface 401, where each of the second sub-pattern arrays includes a plurality of second patterns. In step S706, the image capturing device 450 sequentially captures the second sub-pattern arrays projected on the projection surface 401 to output a plurality of second pattern images 452. In step S707, the processing device 410 analyzes the second pattern images 451 to obtain a plurality of second pattern coordinates and a second pattern order of a plurality of second projected patterns 532 in each of the second pattern images 452. In step S708, the processing device 110 determines at least a part of the second projected patterns 532 to be a plurality of second effective patterns 533 according to the second pattern coordinates and the second pattern order, and adjusts the second projection device 430 according to the second effective patterns 533.

In step S709, the third projection device 440 sequentially projects a plurality of third sub-pattern arrays (for example, the sub-pattern arrays 211-214) of a third pattern array (for example, the pattern array 210) to the projection region 441 of the projection surface 401, where each of the third sub-pattern arrays includes a plurality of third patterns. In step S710, the image capturing device 450 sequentially captures the third sub-pattern arrays projected on the projection surface 401 to output a plurality of third pattern images 453. In step S711, the processing device 410 analyzes the third pattern images 453 to obtain a plurality of third pattern coordinates and a third pattern order of a plurality of third projected patterns 542 in each of the third pattern images 453. In step S712, the processing device 110 determines at least a part of the third projected patterns 542 to be a plurality of third effective patterns 543 according to the third pattern coordinates and the third pattern order, and adjusts the third projection device 440 according to the third effective patterns 543. Based on the above steps S701-S712, the images at the overlapped regions of the first projection image, the second projection image and the third projection image may be smooth and complete projection images, or the first projection image, the second projection image and the third projection image may be conformed to the preset projection region 402 on the projection surface 401 to display a smooth and complete projection result.

Further, the embodiment may further include a step S713 and a step S714. In the step S713, the processing device 410 orders a plurality of full image patterns of the full image according to the first effective patterns 523, the second effective patterns 533, and the third effective patterns 543. In step S714, the processing device 410 determines a border of the overlapped projection region 403 of the first projection device 420, the second projection device 430, and the third projection device 440 according to a plurality of full-image effective patterns, and adjusts the boarder of the overlapped projection region 403 to match a range of the preset projection region 402. Therefore, the self-adaptive adjustment method of the embodiment may automatically perform adaptive adjustment on the first projection device 420, the second projection device 430, and the third projection device 440 to provide a good full image (a splicing result of multiple images) projection effect. However, regarding device features, projection method and implementation details of the projection system 400 of the embodiment, reference may be made to the description of the above-mentioned embodiments of FIG. 1 and FIG. 6 to obtain sufficient instructions, suggestions, and implementation descriptions, so that details thereof are not repeated.

In summary, the embodiments of the disclosure have at least one of following advantages or effects. In the projection system and the self-adaptive adjustment method thereof, in order to avoid dislocation of a plurality of patterns in the pattern array that are projected to the projection surface for correcting the projection device along with distortion of the projection surface to cause image capturing error of the image capturing device, the projection device of the disclosure projects a plurality of sub-pattern arrays in time-division, and the image capturing device captures a plurality of pattern images, and the processing device may obtain the correct pattern coordinates and the correct pattern order of a plurality of patterns in batches. Therefore, the projection system of the disclosure may perform effective projection correction according to the correct pattern coordinates and the pattern order to provide a good projection effect.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection system, comprising a first projection device, an image capturing device, and a processing device, wherein, the first projection device is configured to sequentially project a plurality of first sub-pattern arrays of a first pattern array to a first projection region of a projection surface, wherein each of the first sub-pattern arrays comprises a plurality of first patterns;

the image capturing device is configured to sequentially capture the first sub-pattern arrays projected on the projection surface to output a plurality of first pattern images;

the processing device is coupled to the first projection device and the image capturing device, and is configured to analyze the first pattern images to obtain a plurality of first pattern coordinates and a first pattern order of a plurality of first projected patterns in each of the first pattern images, wherein the processing device determines at least a part of the first projected patterns to be a plurality of first effective patterns according to the first pattern coordinates and the first pattern order, and adjusts the first projection device according to the first effective patterns, wherein the each of the first sub-pattern arrays is a different row in the first pattern array.

2. The projection system as claimed in claim 1, wherein the each of the first sub-pattern arrays is a different column and different row in the first pattern array.

3. The projection system as claimed in claim 1, wherein the processing device determines a first effective projection range of the first projection device according to the first effective patterns.

4. The projection system as claimed in claim 1, wherein the processing device adjusts a first projection image projected by the first projection device according to the first effective patterns, so that the first projection image is adjusted to correspond to a distortion result of the projection surface in the first projection region.

5. A projection system, comprising a first projection device, an image capturing device, and a processing device, wherein, the first projection device is configured to sequentially project a plurality of first sub-pattern arrays of a first pattern array to a first projection region of a projection surface, wherein each of the first sub-pattern arrays comprises a plurality of first patterns;

the image capturing device is configured to sequentially capture the first sub-pattern arrays projected on the projection surface to output a plurality of first pattern images;

the processing device is coupled to the first projection device and the image capturing device, and is configured to analyze the first pattern images to obtain a plurality of first pattern coordinates and a first pattern order of a plurality of first projected patterns in each of the first pattern images, wherein the processing device determines at least a part of the first projected patterns to be a plurality of first effective patterns according to the first pattern coordinates and the first pattern order, and adjusts the first projection device according to the first effective patterns, wherein the minimum distance between two pattern centers of the first patterns projected by the first projection device in any two adjacent projections is smaller than a pattern diameter of the first pattern.

6. A projection system, comprising a first projection device, an image capturing device, and a processing device, wherein, the first projection device is configured to sequentially project a plurality of first sub-pattern arrays of a first pattern array to a first projection region of a projection surface, wherein each of the first sub-pattern arrays comprises a plurality of first patterns;

the image capturing device is configured to sequentially capture the first sub-pattern arrays projected on the projection surface to output a plurality of first pattern images;

the processing device is coupled to the first projection device and the image capturing device, and is configured to analyze the first pattern images to obtain a plurality of first pattern coordinates and a first pattern order of a plurality of first projected patterns in each of the first pattern images, wherein the processing device determines at least a part of the first projected patterns to be a plurality of first effective patterns according to the first pattern coordinates and the first pattern order, and adjusts the first projection device according to the first effective patterns, wherein the first patterns of the each of the first sub-pattern arrays are not adjacent to each other in the pattern array.

7. A projection system, comprising a first projection device, an image capturing device, and a processing device, wherein, the first projection device is configured to sequentially project a plurality of first sub-pattern arrays of a first pattern array to a first projection region of a projection surface, wherein each of the first sub-pattern arrays comprises a plurality of first patterns;

the image capturing device is configured to sequentially capture the first sub-pattern arrays projected on the projection surface to output a plurality of first pattern images;

the processing device is coupled to the first projection device and the image capturing device, and is configured to analyze the first pattern images to obtain a plurality of first pattern coordinates and a first pattern order of a plurality of first projected patterns in each of the first pattern images, wherein the processing device determines at least a part of the first projected patterns to be a plurality of first effective patterns according to the first pattern coordinates and the first pattern order, and adjusts the first projection device according to the first effective patterns, further comprising a second projection device, wherein the second projection device is configured to sequentially project a plurality of second sub-pattern arrays of a second pattern array to a second projection region of the projection surface, wherein each of the second sub-pattern arrays comprises a plurality of second patterns, wherein the first projection region is partially overlapped with the second projection region, and the image capturing device is further configured to sequentially capture the second sub-pattern arrays projected on the projection surface to output a plurality of second pattern images;

wherein the processing device is configured to analyze the second pattern images to obtain a plurality of second pattern coordinates and a second pattern order of a plurality of second projected patterns in each of the second pattern images, wherein the processing device determines at least a part of the second projected patterns to be a plurality of second effective patterns according to the second pattern coordinates and the second pattern order, and adjusts the second projection device according to the second effective patterns.

8. The projection system as claimed in claim 7, wherein the processing device orders a plurality of full image effective patterns of a full image according to the first effective patterns and the second effective patterns, and the processing device determines a border of an overlapped projection region of the first projection device and the second projection device according to the full image effective patterns.

9. A self-adaptive adjustment method of a projection system, comprising:

using a first projection device to sequentially project a plurality of first sub-pattern arrays of a first pattern array to a first projection region of a projection surface, wherein each of the first sub-pattern arrays comprises a plurality of first patterns;

using an image capturing device to sequentially capture the first sub-pattern arrays projected on the projection surface to output a plurality of first pattern images;

analyzing the first pattern images to obtain a plurality of first pattern coordinates and a first pattern order of a plurality of first projected patterns in each of the first pattern images; and determining that at least a part of the first projected patterns is a plurality of first effective patterns according to the first pattern coordinates and the first pattern order, and adjusting the first projection device according to the first effective patterns, wherein the each of the first sub-pattern arrays is a different row in the first pattern array.

10. The self-adaptive adjustment method as claimed in claim 9, wherein the each of the first sub-pattern arrays is a different column and different row in the first pattern array.

11. The self-adaptive adjustment method as claimed in claim 9, wherein the step of adjusting the first projection device according to the first effective patterns comprises:

determining a first effective projection range of the first projection device according to the first effective patterns.

12. The self-adaptive adjustment method as claimed in claim 9, wherein the step of adjusting the first projection device according to the first effective patterns comprises:

adjusting a first projection image projected by the first projection device according to the first effective patterns, so that the first projection image is adjusted to correspond to a distortion result of the projection surface in the first projection region.

13. A self-adaptive adjustment method of a projection system, comprising:

using a first projection device to sequentially project a plurality of first sub-pattern arrays of a first pattern array to a first projection region of a projection surface, wherein each of the first sub-pattern arrays comprises a plurality of first patterns;

using an image capturing device to sequentially capture the first sub-pattern arrays projected on the projection surface to output a plurality of first pattern images;

analyzing the first pattern images to obtain a plurality of first pattern coordinates and a first pattern order of a plurality of first projected patterns in each of the first pattern images; and determining that at least a part of the first projected patterns is a plurality of first effective patterns according to the first pattern coordinates and the first pattern order, and adjusting the first projection device according to the first effective patterns, wherein the minimum distance between two pattern centers of the first patterns projected by the first projection device in any two adjacent projections is smaller than a pattern diameter of the first pattern.

14. A self-adaptive adjustment method of a projection system, comprising:

using a first projection device to sequentially project a plurality of first sub-pattern arrays of a first pattern array to a first projection region of a projection surface, wherein each of the first sub-pattern arrays comprises a plurality of first patterns;

using an image capturing device to sequentially capture the first sub-pattern arrays projected on the projection surface to output a plurality of first pattern images;

analyzing the first pattern images to obtain a plurality of first pattern coordinates and a first pattern order of a plurality of first projected patterns in each of the first pattern images; and determining that at least a part of the first projected patterns is a plurality of first effective patterns according to the first pattern coordinates and the first pattern order, and adjusting the first projection device according to the first effective patterns, wherein the first patterns of the each of the first sub-pattern arrays are not adjacent to each other in the pattern array.

15. A self-adaptive adjustment method of a projection system, comprising:

using a first projection device to sequentially project a plurality of first sub-pattern arrays of a first pattern array to a first projection region of a projection surface, wherein each of the first sub-pattern arrays comprises a plurality of first patterns;

using an image capturing device to sequentially capture the first sub-pattern arrays projected on the projection surface to output a plurality of first pattern images;

analyzing the first pattern images to obtain a plurality of first pattern coordinates and a first pattern order of a plurality of first projected patterns in each of the first pattern images;

determining that at least a part of the first projected patterns is a plurality of first effective patterns according to the first pattern coordinates and the first pattern order, and adjusting the first projection device according to the first effective patterns;

using a second projection device to sequentially project a plurality of second sub-pattern arrays of a second pattern array to a second projection region of the projection surface, wherein each of the second sub-pattern arrays comprises a plurality of second patterns, and the first projection region is partially overlapped with the second projection region;

using the image capturing device to sequentially capture the second sub-pattern arrays projected on the projection surface to output a plurality of second pattern images;

analyzing the second pattern images to obtain a plurality of second pattern coordinates and a second pattern order of a plurality of second projected patterns in each of the second pattern images; and determining at least a part of the second projected patterns to be a plurality of second effective patterns according to the second pattern coordinates and the second pattern order, and adjusting the second projection device according to the second effective patterns.

16. The self-adaptive adjustment method as claimed in claim 15, further comprising:

order a plurality of full image effective patterns of a full image according to the first effective patterns and the second effective patterns; and determining a border of an overlapped projection region of the first projection device and the second projection device according to the full image effective patterns.

* * * * *